US006865637B1

(12) United States Patent
Linares et al.

(10) Patent No.: US 6,865,637 B1
(45) Date of Patent: Mar. 8, 2005

(54) MEMORY CARD AND SYSTEM FOR UPDATING DISTRIBUTED MEMORY

(75) Inventors: Ignacio A. Linares, Plano, TX (US); Robert S. Gammenthaler, Jr., Frisco, TX (US); Edwin J. Burger, Flower Mound, TX (US)

(73) Assignee: Alcatel, Paris (FR)

( * ) Notice: Subject to any disclaimer, the term of this patent is extended or adjusted under 35 U.S.C. 154(b) by 576 days.

(21) Appl. No.: 09/891,999

(22) Filed: Jun. 26, 2001

(51) Int. Cl.[7] .............................................. G06F 1/00
(52) U.S. Cl. ................. 710/305; 710/309; 710/316; 710/301; 710/61; 709/248; 700/5; 700/20
(58) Field of Search ................. 710/305–306, 710/308–316, 38, 58, 61, 300–304, 317; 709/201–203, 248, 215–219; 700/2, 5, 17, 20; 711/147–150, 161–62, 173; 707/104, 10, 9; 370/258, 255, 257

(56) References Cited

U.S. PATENT DOCUMENTS

| 5,465,082 A | * 11/1995 | Chaco .................... 340/825.54 |
| 5,664,198 A | * 9/1997 | Chen et al. ................... 710/260 |
| 5,706,482 A | * 1/1998 | Matsushima et al. ....... 710/107 |
| 5,758,083 A | * 5/1998 | Singh et al. ................. 709/227 |
| 5,802,325 A | * 9/1998 | Le Roux ..................... 710/302 |
| 5,878,217 A | * 3/1999 | Cherukuri ................... 709/217 |
| 5,999,518 A | * 12/1999 | Nattkemper et al. ........ 370/258 |
| 6,112,271 A | * 8/2000 | Lanus et al. ................. 710/306 |
| 6,125,409 A | * 9/2000 | Le Roux ..................... 710/22 |
| 6,145,046 A | * 11/2000 | Jones ......................... 710/301 |
| 6,286,011 B1 | * 9/2001 | Velamuri et al. ........... 707/104 |
| 6,292,863 B1 | * 9/2001 | Terasaki et al. ............. 710/306 |
| 6,332,198 B1 | * 12/2001 | Simons et al. ................ 714/6 |
| 6,351,820 B1 | * 2/2002 | Oh-Yang et al. ............ 713/323 |
| 6,381,239 B1 | * 4/2002 | Atkinson et al. ............ 370/362 |
| 6,463,338 B1 | * 10/2002 | Neet ............................ 700/17 |
| 6,526,419 B1 | * 2/2003 | Burton et al. ................ 707/204 |
| 6,725,307 B1 | * 4/2004 | Alvarez et al. .............. 710/110 |
| 6,725,317 B1 | * 4/2004 | Bouchier et al. ........... 710/312 |
| 6,735,198 B1 | * 5/2004 | Edsall et al. ................. 370/389 |
| 6,742,068 B2 | * 5/2004 | Gallagher et al. .......... 710/302 |
| 6,754,735 B2 | * 6/2004 | Kale et al. ..................... 710/33 |
| 2001/0007123 A1 | * 7/2001 | Seguchi ....................... 711/162 |

FOREIGN PATENT DOCUMENTS

GB        2354883 A  *  4/2001  ............ H05K/7/14

\* cited by examiner

Primary Examiner—Paul R. Myers
Assistant Examiner—Raymond N Phan

(57) ABSTRACT

A memory card cooperating with a network interface for receiving data entry and update signals from a database manager via a switch fabric and with a bus interface for outputting data on a system bus disposed in a system shelf, which shelf forms at least a portion of a telecommunications node having a distributed scalable database system. The memory card is operable to contain at least a portion of the distributed database in a high speed, high density memory block disposed thereon, which memory block is coupled to a network interface controller via a first memory interface and to a bus interface controller via a second memory interface. An arbiter is coupled to the first and second memory interfaces for arbitrating data input operations and data output operations with respect to the memory block.

33 Claims, 4 Drawing Sheets

MEMORY CARD AND SYSTEM FOR UPDATING DISTRIBUTED MEMORY

BACKGROUND OF THE INVENTION

1. Technical Field of the Invention

The present invention generally relates to storage architecture solutions. More particularly, and not by way of any limitation, the present invention is directed to a distributed scalable storage fabric architecture solution for use with a network element.

2. Description of Related Art

Over the last two decades or so, telecommunication services have evolved rapidly from simple telephone calls and fax communications to a host of advanced services such as multi-party conferences, voice mail, call forwarding, caller ID, call waiting, number portability, et cetera. This rapid evolution has been made possible primarily due to the successful deployment of the Intelligent Network (IN) and Advanced IN (AIN) architecture using Signaling System No. 7 (SS7) as the out-of-band signaling protocol infrastructure. Similarly, data services have also followed a significant transformation from basic text messaging in the 1980s to the World Wide Web and Internet of today, where transporting diverse media has become commonplace. For example, bandwidth-intensive services such as desktop video conferencing, video on demand, telemedicine, real-time audio, and many other applications are driving the demand for simultaneous support of different types of services on she same public network.

Coupled with the phenomenal popularity of the Internet, recently there has been a tremendous interest in using the packet-switched network (PSN) infrastructure employed in the data networks (e.g., those based on Internet Protocol (IP) addressing) as a replacement for, and/or as an adjunct to, the existing circuit-switched network (CSN) infrastructure deployed in tcday's voice networks. Several advantages are expected to be realized due to such integration. From network operators' viewpoint, the inherent traffic aggregation in PSN allows for a reduction in the cost of transmission and the infrastructure cost per end-user. Ultimately, such cost reductions enable the network operators to pass on the savings to subscribers or, more generally, users. Also, operators of a new breed of service-centric networks (referred to as next-generation networks, distinct from the existing voice-centric and data-centric networks) are poised to offer enhanced services with integrated voice/data/video to users who will be using endpoints having diverse multimedia capabilities.

It is axiomatic that as the service capabilities of the networks continue to grow, the requirements of databases associated therewith, which databases are necessary to facilitate the provisioned services as well as network administration and traffic management, also increase concomitantly. Not only do the database size and performance requirements go up, but the database architectural arrangement itself must be scalable also in order to be able to accommodate increased network traffic and connectivity.

In conventional database implementations, as the memory-resident database size requirements increase, they outpace the amount of available random access memory (RAM) that can physically be placed on a processor board due to form factor constraints. However, using a hard disk drive with a large storage capacity does not offer a viable solution because of unacceptable levels of data search latency.

Various other solutions that address the increased database requirements also have several deficiencies and shortcomings. For example, although a solid state disk can offer increased capacity without degrading search latency performance, it is extremely expensive and adds extra packaging requirements to the system. Providing additional RAM capacity on a processor card is only a limited option due to the form factor requirements that the cards must adhere to. While separate memory expansion modules may be added to the processor cards by means of a mezzanine card, such solutions are not entirely satisfactory because the mezzanine cards typically have compact form factors.

SUMMARY OF THE INVENTION

Accordingly, the present invention advantageously provides a distributed scalable storage fabric architecture that overcomes these and other shortcomings of the state-of-the-art solutions set forth hereinabove. A plurality of memory cards embody the storage units for implementing a distributed database system, preferably associated with a network element or node. The memory cards are provided with the capability to cooperate with corresponding network interfaces for receiving database entry and update signals (collectively, data input signals or database input signals) from a database manager via a switch fabric associated with the node. The memory cards are also operable to cooperate with a bus interface for outputting data on a system bus disposed in a system shelf which forms at least a portion of the node. Preferably, each memory card is operable to contain at least a portion of the distributed database in a high speed, high density memory block disposed thereon.

In one aspect, the present invention is directed to a memory card for use with a distributed scalable database storage system. Preferably, the memory card comprises a first interface controller operable to be coupled to a first interface, which first interface operates to receive database input signals from a database manager. A second interface controller operable to be coupled to a second interface is also included in the memory card, wherein the second interface is preferably operable to couple the memory card to a bus. A first memory interface is disposed between the first interface controller and a memory block, and a second memory interface is disposed between the memory block and the second interface controller. Preferably, an arbiter is coupled to the first and second memory interfaces for arbitrating data entry/update operations (collectively, data input or database input operations) and data output operations with respect to the memory block.

In one exemplary embodiment, the memory block comprises high speed, high density memory with low latency such as, e.g., dynamic random access memory (DRAM), static random access memory (SRAM), non-volatile memory (NVM), and the like. In another exemplary embodiment, the memory card also comprises an error correct module for ensuring data integrity as the data is entered or updated. In a further exemplary embodiment, a synchronization logic block is included in the memory card, which logic block is operable in response to a data synchronization signal, for synchronizing data input operations with respect to a plurality of memory cards. In a still further exemplary embodiment, the first interface comprises a network interface for interfacing the memory cards to a switch fabric, e.g., an Ethernet fabric. Preferably, the second interface is operable to couple the memory card to a Compact Peripheral Component Interconnect (CPCI) bus that interconnects a plurality of processor cards disposed in the system shelf.

In another aspect, the present invention is directed to a system for updating a distributed database associated with a telecommunications node. The system comprises a database update manager for generating database update signals indicative at least of updated data and at least one memory card disposed in a system shelf forming a portion of the telecommunications node. The memory card cooperates with a network interface for receiving the database update signals through a switch fabric, wherein the memory card is operable to contain at least a portion of the distributed database in a memory block disposed thereon.

In a further aspect, the present invention is directed to a telecommunications network element having a distributed database that is architected as a scalable storage fabric. The network element includes a database manager for generating signals indicative of entering and/or updating data with respect to the distributed database. A switch fabric such as, e.g., an Ethernet fabric, is included for interconnecting a plurality of system shelves. Each system shelf includes a memory card disposed therein, the memory card cooperating with a network interface for receiving the data input signals through the switch fabric and with a bus interface for outputting data on a system bus, e.g., a CPCI bus. Each memory card is operable to contain at least a portion of the distributed database in a high speed, high density memory block disposed thereon.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
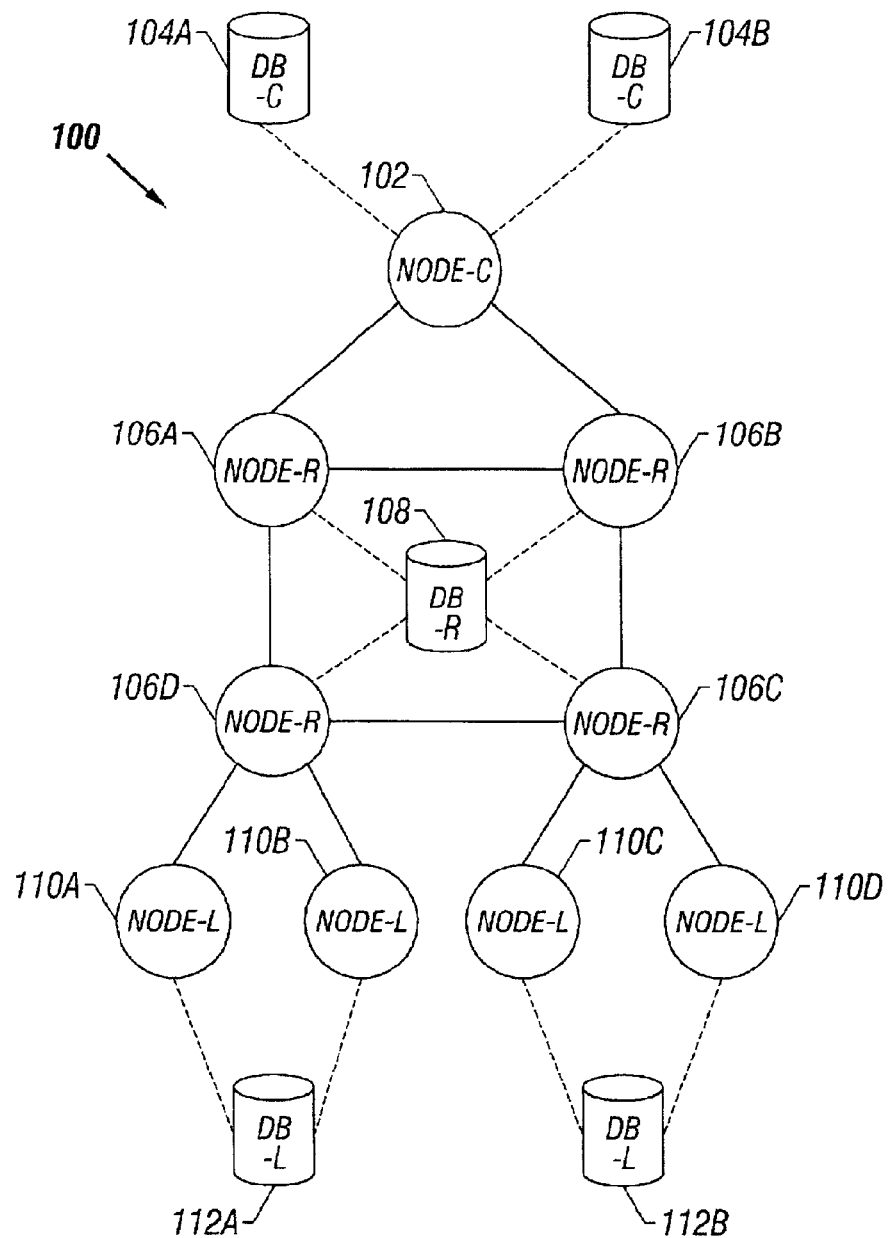
FIG. 1 depicts an exemplary network having a hierarchical database architecture associated therewith, wherein the teachings of the present invention may be advantageously practiced.

In the drawings, like or similar elements are designated with identical reference numerals throughout the several views thereof, and the various elements depicted are not necessarily drawn to scale. Referring now to FIG. 1, depicted therein is an exemplary network 100 having a hierarchical database architecture associated therewith, wherein the teachings of the present invention may be advantageously practiced. Those skilled in the art should readily appreciate that the exemplary network 100 may preferably comprise a telecommunications network, a data communications network, or a hybrid network, and may be provisioned as a circuit-switched network (CSN), a packet-switched network (PSN) or an integrated network such as a next-generation network capable of transmitting diverse media, e.g., voice, audio, video, graphics, data, and assorted multimedia. Moreover, the exemplary network 100 may involve a wireline network, a wireless network, or both. Accordingly, the exemplary network 100 may include one or more legacy CSNs such as the Public Switched Telephone Network (PSTN) for wireline telephony and the Public Land Mobile Network (PLMN) for wireless telephony. Also, one or more PSNs such as the IP-based Internet, ATM-based packet network, and private IP-based networks as, e.g., corporate intranets, enterprise networks, home networks, and the like, may be provided as different embodiments or portions of the exemplary network 100.

Regardless of the implementation, the exemplary network 100 is preferably comprised of a plurality of network elements or nodes interconnected with appropriate links. Further, these nodes may be hierarchically arranged. By way of illustration, one or more "central" nodes, e.g., node 102, one or more "regional" nodes, e.g., nodes 106A through 106D, and one or more "local" nodes, e.g., nodes 110A through 110D, are provided in the exemplary network 100. It should be recognized that the terms "central", "regional", and "local" are used herein only for conveniently categorizing the various levels of the hierarchical arrangement of the exemplary network 100 and not for identifying or specifying any geographical or locational placement of the nodes in the network.

Continuing to refer to FIG. 1, a hierarchical database architecture comprised of a plurality of distributed databases is provided with respect to the exemplary network 100 for facilitating one or more network level services including, e.g., telecommunication (telecom) services, data communication (datacom) services, or both. Again, these databases may be conveniently categorized as "central", "regional", or "local", based on their association with the network nodes disposed at the corresponding hierarchical levels in the exemplary network arrangement. Further, with respect to a network node, the databases may be provided as shared databases, redundant pairs, single database entities, or as entities integrated within the node. By way of illustration, a pair of "central" databases 104A and 104B are associated with node 102 in the exemplary network 100. In similar fashion, a "regional" shared database is coupled to nodes 106A through 106D and a pair of "local" databases 112A and 112B are associated with node pairs 110A/110B and 110C/110D, respectively.

Those skilled in the art should recognize upon reference hereto that the nodes of the exemplary network 100 may be comprised of such network elements as, e.g., signal transfer points (STPs), service control points (SCPs), signal switching points (SSPs), signaling servers with integrated STP/SCP functionality, next generation STPs, routers, gateways, gatekeepers, proxy/redirect servers, service application platforms, and the like. Moreover, as alluded to hereinabove, the associated hierarchical database architecture is operable to effectuate various database applications relating to network traffic management as well as the plethora of telecom and datacom services provisioned in the network, such as, for instance, Local Number Portability (LNP) database applications, directory number databases, abbreviated number translation applications, toll free number databases, subscriber service profiles, address translation applications, routing tables, et cetera.

Figure 2:
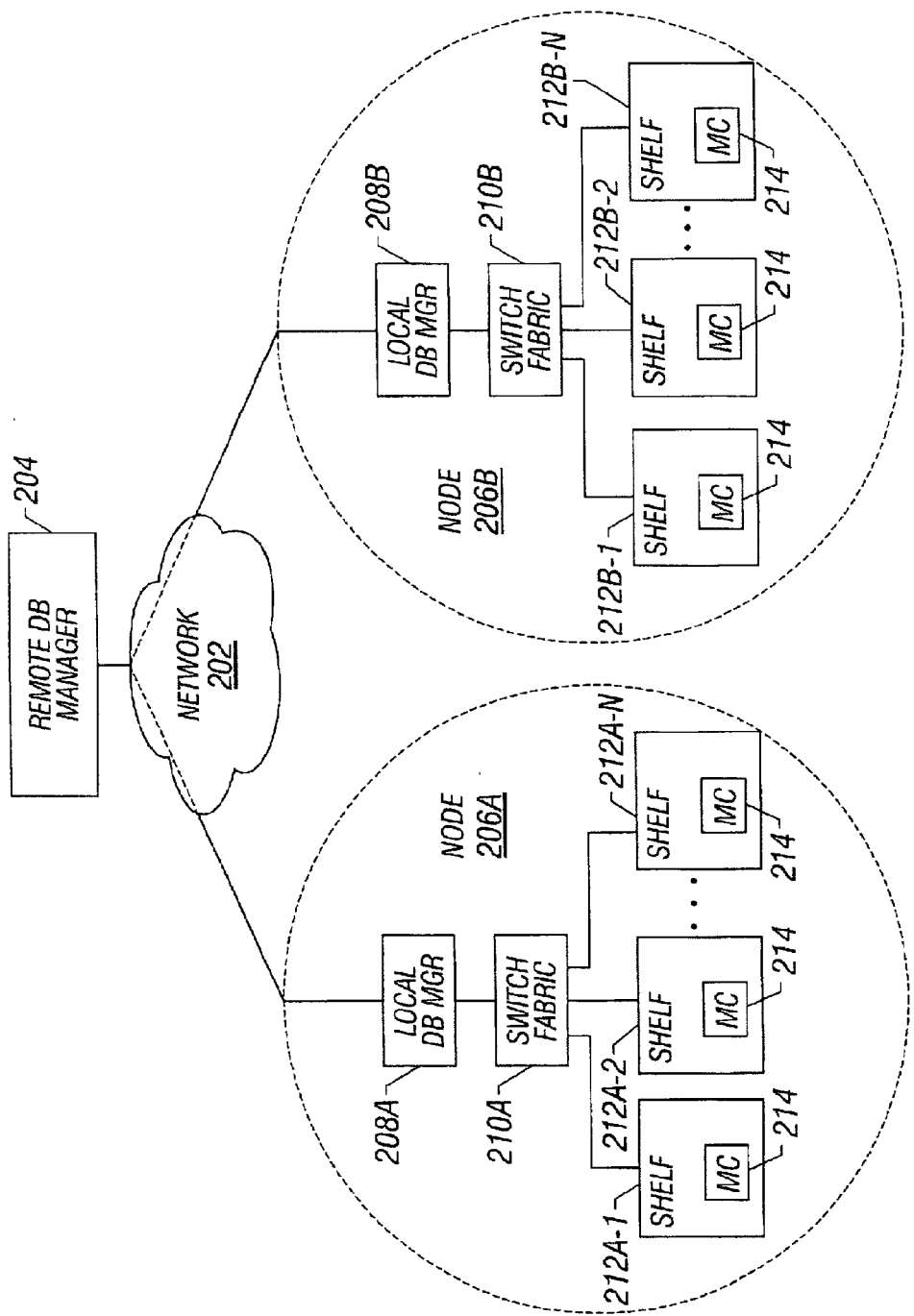
FIG. 2 depicts a portion of the exemplary network with additional details regarding a network element provided in accordance with the teachings of the present invention.

FIG. 2 depicts a network portion 202 of the exemplary network 100 with additional details regarding a network element provided in accordance with the teachings of the present invention, wherein a database associated with the network element is architected as a distributed scalable storage fabric system that supports low latency data search operations as well as efficient data entry/update management. A pair of network nodes 206A and 206B are exemplified herein, which nodes may correspond to any of the hierarchical levels in the network arrangement depicted in FIG. 1. A remote database manager 204 is provided for managing, maintaining, administering and updating databases associated with the nodes that form the network portion 202. In an exemplary embodiment, the databases associated with the nodes 206A and 206B may comprise LNP databases local thereto, wherein the remote database manager 204 is preferably operable as a "centralized" entity that generates global database entry/update signals (i.e., database input signals) that are transmitted via the network portion 202 for appropriate action at the node level.

Each node is preferably associated with a database manager that is "local" thereto, regardless of whether the database manager is co-located with the node, integrated therewith, or configured otherwise. Accordingly, although the embodiment depicted in FIG. 2 provides local database managers 208A and 208B as part of nodes 206A and 206B, respectively, it should be apparent that such an arrangement is solely exemplary. Irrespective of the exact configuration, the local database managers are operable responsive to the global database input signals provided by the remote database manager 204 for appropriately entering and/or updating the data in the local databases.

In a presently preferred exemplary embodiment of the present invention, each node is comprised of a plurality of system shelves interconnected via a switch fabric in well known manner, wherein each system shelf is responsible for controlling a plurality of line card shelves provided in a rack assembly. For instance, switch fabric 210A and switch fabric 210B are accordingly exemplified with respect to nodes 206A and 206B, respectively. It should be recognized that the switch fabric may be implemented in any known or heretofore unknown technology or topology. In one exemplary embodiment, the switch fabrics 210A and 210B are preferably implemented as Ethernet fabrics, e.g., 100Base-T, et cetera.

Reference numerals 212A-1 through 212A-N and 212B-1 through 212B-N refer to the plurality of system shelves for nodes 206A and 206B, respectively. In accordance with the teachings of the present invention, each system shelf is provided with a memory card (MC) 214 operable to contain at least a portion of the distributed database of the node. Where the database is not partitioned, each memory card of the node may contain a full and exact copy of the entire local database. On the other hand, where a partitioning scheme is employed, the contents of the memory cards may vary depending upon the partitioning scheme. For example, if there are eight system shelves, each with a memory card disposed therein, and the database is partitioned eight ways, each memory card contains ⅛th of the database that is different from the remaining portions residing on the other cards. If the same database is partitioned four ways, each database portion is provided in two memory cards, each of which contains an exact copy of the other.

It should be appreciated that where the contents of memory cards are duplicated, it is necessary that database entry operations and database update operations (i.e., database input operations) be synchronized with respect to such memory cards so as to maintain database integrity. Accordingly, a database synchronization signal generator may be provided in association with the local database manager, which signal generator is operable to generate appropriate database entry synchronization signals and database update synchronization signals for ensuring that database entries and updates are performed without timing-related errors. Although not specifically illustrated in FIG. 2, such a synchronization signal generator may be co-located with the local database manager, or integrated therewith, or configured otherwise with respect to the node.

Figure 3:
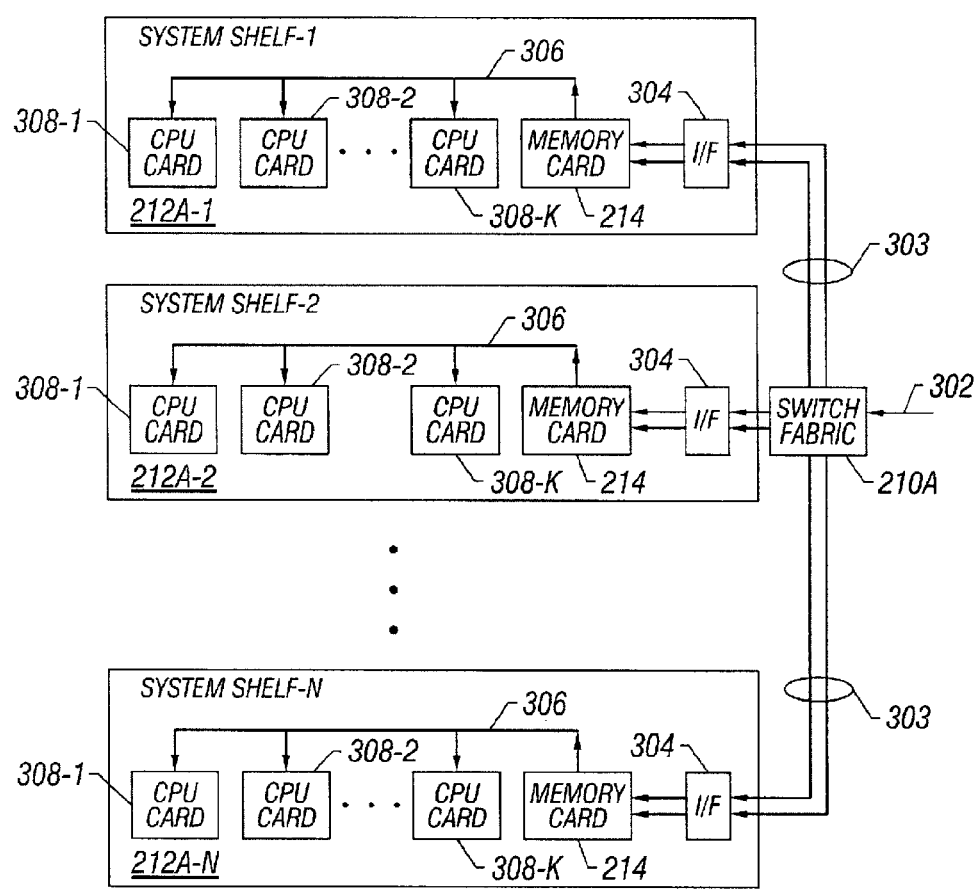
FIG. 3 depicts a functional block diagram of a distributed scalable storage fabric architecture using network interfacing for data input operations in accordance with the teachings of the present invention.

Referring now to FIG. 3, depicted therein is a functional block diagram of a distributed scalable storage fabric architecture using network interfacing for effectuating centralized data entry/update operations with respect to a network node in accordance with the teachings of the present invention. Additionally, the storage fabric architecture advantageously supports low latency data search operations necessary in data-intensive telecom/datacom service applications.

In particular, the database system associated with node 206A (described hereinabove regarding FIG. 2) is exemplified herein as an illustrative embodiment of the distributed scalable storage fabric architecture of the present invention. As alluded to in the foregoing, the switch fabric 210A is operable to receive data signals (for data entry and/or data updates) via signal path 302, which signals are generated by the database manager associated with the node (not explicitly shown in this FIG.). The data signals are operable to be transported via the switch fabric 210A to a plurality of addressable memory cards (e.g., memory card 214), each of which is disposed in a system shelf. Further, each memory card 214 is preferably provided with the capability to cooperate with a fabric network interface 304 disposed on a fabric communication path 303 that corresponds to the system shell with which the memory card is associated.

As will be described in greater detail hereinbelow, the memory card 214 is also provided with the capability to be coupled to a system bus 306 disposed in the system shelf. The system bus 306 may be comprised of any known or heretofore unknown bus technology operable to interconnect a plurality of devices. In a presently preferred exemplary embodiment of the present invention, the system bus 306 comprises a bus segment that is operable to interconnect a plurality of processors (e.g., CPU cards 308-1 through 308-K). By way of particular illustration, the system bus 306 is preferably comprised of a bus segment that complies with the Compact Peripheral Component Interconnect (CPCI) standard. The processor cards 308-1 through 308-K disposed on the system bus 306 are operable to access data from the memory card 214 with low latency. Although not explicitly shown in this FIG., each system shelf is associated with one or more line card shelves organized as a rack, as pointed out hereinabove.

Because the architecture of the switch fabric 210A is scalable, the distributed database system as embodied by the plurality of memory cards is accordingly architected as a storage fabric wherein the storage units (i.e., the memory cards) as well as the number of system shelves can be scalably increased as the requirements and/or complexity of the node also increase due to, e.g., the deployment of more sophisticated databases, additional links, etc. New fabric communication paths such as paths 303 can be added on as needed basis with relative ease for the extra memory cards having the capability to cooperate with the network interfaces in accordance herewith.

Figure 4:
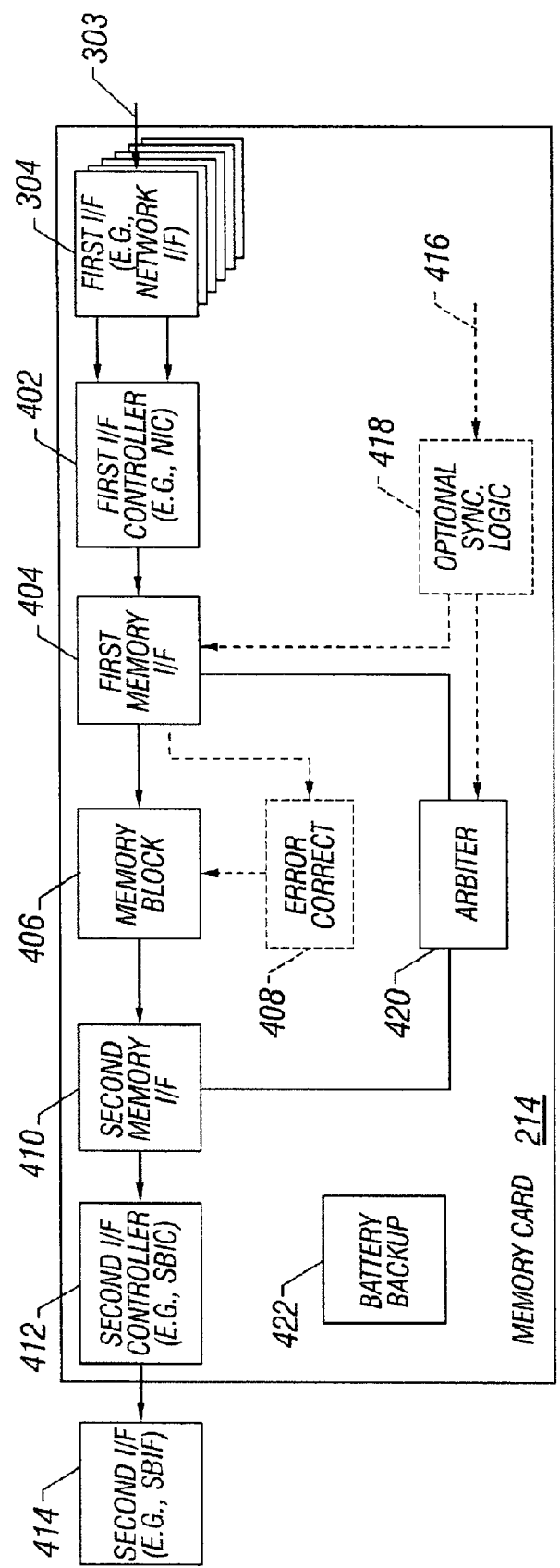
FIG. 4 depicts an exemplary embodiment of a memory card of the distributed scalable storage system of the present invention, wherein the memory card is provided with network interface and system bus interface capability.

FIG. 4 depicts an exemplary embodiment of the memory card 214 of the distributed scalable storage system of the present invention, wherein the memory card 214 is advantageously provided with both network interface and system bus interface capability. A first interface such as, e.g., network interface 304, is provided for facilitating a cooperative relationship between the memory card 214 and the corresponding fabric communication path 303. Additional network interfaces capable of cooperating with other types of fabric networks may also be provided for versatile deployment. The exemplary memory card 214 includes a first interface controller 402 (e.g., a network interface controller or NIC) operable to be coupled to the first interface 304, wherein the first interface preferably operates to receive database entry and database update signals via path 303. It should be appreciated that multiple interface controllers may be provided where additional network interfaces are included. A second interface 414 (such as, e.g., a system bus interface or SBIF) is provided for coupling the memory card 214 to a system bus (not shown). A second interface controller 412 (e.g., a system bus interface controller or SBIC) is included in the memory card 214 for facilitating the bus interfacing.

In accordance with the teachings of the present invention, a memory block 406 having first and second memory interfaces 404 and 410, respectively, is provided for storing at least a portion of a distributed database. Data entry/update operations (i.e., database input operations) are effectuated via memory interface 404 responsive to the data entry/update signals (i.e., database input signals) received via the network interface 304. Similarly, database output or access operations are effectuated via memory interface 410. To ensure that data input and data output operations are effectuated properly without contention, an arbiter 420 is preferably coupled to memory interfaces 404, 410 for arbitrating the database entry/update operations and the data access operations with respect to the memory block.

Where a plurality of memory cards having "mirror" database portions are provided as part of the scalable storage fabric, an optional synchronization logic block 418 may also be included in the exemplary memory card 214. Preferably, logic block 418 is operable responsive to a data input synchronization signal 416 provided by a synchronization logic signal generator (not shown in this FIG.) for synchronizing data input operations with respect to such memory cards. In an exemplary embodiment, the data synchronization signal may be derived from a system clock or a network clock for providing a time stamp or strobe via a suitable time-division-multiplexed, frame-formatted control signal generated from a central source in the node. Further, the memory block 406 preferably comprises any known or heretofore unknown high speed, high density memory with low latency such as, e.g., dynamic random access memory (DRAM), static random access memory (SRAM), non-volatile memory (NVM), and the like. In a further exemplary embodiment, the memory card 214 also comprises an error correct module 408 for ensuring data integrity as data is entered or updated, as well as an optional battery backup facility 422.

Based upon the foregoing Detailed Description, it should be readily apparent that the present invention advantageously provides a distributed storage solution that is not only scalable, but also supports low latency data search operations suitable for data-intensive carrier-grade service applications. The memory card architecture having bus interface as well as network interface capability in accordance with the teachings herein provides the advantage of being able to simultaneously update multiple memory cards from a central fabric network source. An additional advantage is that because the data entries and updates occur directly to the memory card via the network interface, a processor on the system bus does not have to be involved with this task. As a result, bandwidth on the system bus is more efficiently used for access operations with respect to reading data from the memory because data updates/entries (i.e., write operations) are not occurring via the system bus. Moreover, for operations where data across multiple memory cards has to be synchronized, the present invention provides an optional synchronization signal that can be utilized to strobe the data into the memory cards simultaneously.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A memory card, comprising:
  a first interface controller operable to be coupled to a first interface, said first interface operating to receive database input signals;
  a second interface controller operable to be coupled to a second interface, said second interface operating to couple said memory card to a bus;
  a first memory interface disposed between said first interface controller and a memory block,
  a second memory interface disposed between said memory block and said second interface controller; and
  an arbiter coupled to said first and second memory interfaces for arbitrating data input operations and data output operations with respect to said memory block.

2. The memory card as set forth in claim 1, wherein said first interface comprises a network interface coupled to a switch fabric disposed in a telecommunications node.

3. The memory card as set forth in claim 1, further comprising an error correct module coupled to said memory block.

4. The memory card as set forth in claim 1, further comprising a synchronization logic block, said synchronization logic block operating, responsive to a data synchronization signal, to synchronize said data input operations with respect to said memory block with data input operations associated with another memory card.

5. The memory card as set forth in claim 1, wherein said memory block comprises at least one dynamic random access memory (DRAM) module.

6. The memory car as set forth in claim 1, wherein said memory block comprises at least one static random access memory (SRAM) module.

7. The memory card as set forth in claim 1, wherein said memory block comprises at least one high speed, high density non-volatile memory (NVM) module.

8. The memory card as set forth in claim 1, wherein said bus comprises a system bus operating to interconnect a plurality of processor cards disposed in a system shelf.

9. The memory card as set forth in claim 2, where said switch fabric comprises an Ethernet fabric.

10. The memory card as set forth in claim 8, wherein said system bus comprises a Compact Peripheral Component Interconnect (CPCI) bus.

11. The memory card as set forth in claim 8, wherein said system shelf forms at least a portion of a telecommunications node.

12. A system for updating a distributed database associated with a telecommunications node, comprising:
  a database update manager for generating database update signals indicative at least of updated data; and
  at least one memory card disposed in a system shelf forming a portion of said telecommunications node, said at least one memory card cooperating with a network interface for receiving said database update signals through a switch fabric, wherein said at least one memory card is operable to contain at least a portion of said distributed database in a memory block disposed thereon.

13. The system for updating a distributed database associated with a telecommunications node as set forth in claim 12, further comprising a synchronization signal generator associated with said database update manager, wherein said synchronization signal generator is operable to provide a data update synchronization signal for synchronizing said database update signals provided to a plurality of said memory cards.

14. The system for updating a distributed database associated with a telecommunications node as set forth in claim 12, wherein said database update manager is co-located with said telecommunications node.

15. The system for updating a distributed database associated with a telecommunications node as set forth in claim 12, wherein said switch fabric comprises an Ethernet fabric.

16. The system for updating a distributed database associated with a telecommunications node as set forth in claim 12, wherein said memory block comprises a dynamic random access memory (DRAM) module.

17. The system for updating a distributed database associated with a telecommunications node as set forth in claim 12, wherein said memory block comprises a static random access memory (SRAM) module.

18. The system for updating a distributed database associated with a telecommunications node as set forth in claim 12, wherein said memory block comprises a non-volatile memory (NVM) module.

19. The system for updating a distributed database associated with a telecommunications node as set forth in claim 12, wherein said at least one memory card comprises:
   a network interface controller operable to be coupled to said network interface;
   a bus interface controller operable to be coupled to a system bus interface, said system bus interface operating to couple said at least one memory card to a system bus;
   first and second memory interfaces associated with said memory block, wherein said first memory interface is disposed between said network interface controller and said memory block and said second memory interface is disposed between said bus interface controller and said memory block; and
   an arbiter coupled to said first and second memory interfaces for arbitrating data update operations and data output operations with respect to said memory block.

20. The system for updating a distributed database associated with a telecommunications node as set forth in claim 13, wherein said synchronization signal generator is integrated with said database update manager.

21. The system for updating a distributed database associated with a telecommunications node as set forth in claim 19, wherein said at least one memory card further comprises an error correct module coupled to said memory block.

22. The system for updating a distributed database associated with a telecommunications node as set forth in claim 19, wherein said system bus is operable to interconnect a plurality of processor cards.

23. The system for updating a distributed database associated with a telecommunications node as set forth in claim 22, wherein said system bus comprises a Compact Peripheral Component Interconnect (CPCI) bus.

24. A telecommunications node having a distributed database, comprising:
   a database manager for generating signals indicative at least one of updating and entering data with respect to said distributed database;
   a switch fabric interconnecting a plurality of system shelves; and
   a memory card disposed in each system shelf, said memory card cooperating with a network interface for receiving said signals through said switch fabric and with a bus interface for outputting data on a system bus, wherein said memory card is operable to contain at least a portion of said distributed database in a memory block disposed thereon.

25. The telecommunications node having a distributed database as set forth in claim 24, wherein said switch fabric comprises an Ethernet fabric.

26. The telecommunications node having a distributed database as set forth in claim 24, further comprising a synchronization signal generator associated with said database manager, wherein said synchronization signal generator is operable to provide a data synchronization signal for synchronizing database input operations with respect to said memory cards.

27. The telecommunications node having a distributed database as set forth in claim 24, wherein said memory block comprises at least one dynamic random access memory (DRAM) module.

28. The telecommunications node having a distributed database as set forth in claim 24, wherein said memory block comprises at least one static random access memory (SRAM) module.

29. The telecommunications node having a distributed database as set forth in claim 24, wherein said memory block comprises at least one non-volatile memory (NVM) module.

30. The telecommunications node having a distributed database as set forth in claim 24, wherein said system bus comprises a bus segment operating to interconnect a plurality of processor cards.

31. The telecommunications node having a distributed database as set forth in claim 24, wherein said memory card comprises an error correct module coupled to said memory block.

32. The telecommunications node having a distributed database as set forth in claim 30, wherein said bus segment comprises a Compact Peripheral Component Interconnect (CPCI) bus segment.

33. The telecommunications node having a distributed database as set forth in claim 24, wherein said memory card comprises:
   a network interface controller operable to be coupled to said network interface;
   a bus interface controller operable to be coupled to said bus interface;
   first and second memory interfaces associated with said memory block, wherein said first memory interface is disposed between said network interface controller and said memory block and said second memory interface is disposed between said bus interface controller and said memory block; and
   an arbiter coupled to said first and second memory interfaces for arbitrating data input operations and data output operations with respect to said memory block.

* * * * *